United States Patent [19]

McDowell et al.

[11] Patent Number: 4,659,410
[45] Date of Patent: Apr. 21, 1987

[54] METHOD OF MAKING A SILK-SCREENED GASKET OF ENHANCED SEALING CHARACTERISTICS

[75] Inventors: Donald J. McDowell, Riverside; Jerri L. Cooper, Lombard, both of Ill.

[73] Assignee: Felt Products Mfg. Co., Skokie, Ill.

[21] Appl. No.: 718,643

[22] Filed: Apr. 1, 1985

[51] Int. Cl.$^4$ ............................................. B32B 31/12
[52] U.S. Cl. ..................................... 156/277; 156/329; 277/235 B; 427/282
[58] Field of Search .................. 156/277, 278, 329; 277/235 B; 427/282

[56] References Cited

U.S. PATENT DOCUMENTS 3,477,867  11/1969  Hillier ........................... 156/277 X
4,471,007  9/1984   Pate ............................... 156/329 X

*Primary Examiner*—Robert A. Dawson
*Attorney, Agent, or Firm*—Dressler, Goldsmith, Shore, Sutker & Milnamow, Ltd.

[57] ABSTRACT

A method of making a gasket assembly of enhanced sealing characteristics comprising the steps of providing a gasket body having an expansive metallic core and at least one compressible fiber-elastomer facing layer and defining at least one clear-through opening, providing a silk screen through which a fluid silicone sealant material is adapted to be squeezed in a desired sealing pattern onto the gasket body, squeezing through the silk screen a fluid, moisture-carbon dioxide curable, silicone sealant material which is curable in the presence of high humidity and carbon dioxide levels into a desired sealing pattern onto the facing layer without intervening barrier coats, preheating the gasket body to a temperature of from about 170° F. to about 185° F. for about 30 to 60 seconds without added moisture, positioning the patterned gasket body in a chamber, and exposing the gasket body in the chamber to a conditioned atmosphere of humidity of at least about 85% relative humidity and of a carbon dioxide volume percent of from about 9 to about 13%, for from about 5 to about 8 minutes, thereby to cure the silicone sealant material to form an elastomeric silicone sealing pattern on the gasket body.

3 Claims, 7 Drawing Figures

METHOD OF MAKING A SILK-SCREENED GASKET OF ENHANCED SEALING CHARACTERISTICS

TECHNICAL FIELD

This invention relates to improvements in gasket assemblies, especially those intended for automotive use. In particular, this invention relates to enhancements in the manufacture of such gasket assemblies in which sealing components are applied to gasket assemblies by a silk-screening process.

BACKGROUND OF THE INVENTION

Although the mating surfaces of pairs of surfaces to be sealed, such as mating engine head and block surfaces, appear to be smooth and flat, most frequently they are not sufficiently smooth to provide an effective seal. Accordingly, a gasket is required to be placed between them to provide an effective seal. That is uniformly true for head gaskets for internal combustion engines.

There are a wide variety of head gasket designs which include inter alia, metal gaskets, gaskets of fibrous materials, sandwich type gaskets which combine a metallic core and compressible fiber-elastomer facing materials laminated to the core, and so forth. Some such gaskets incorporate specially armored combustion openings, thereby to assist in withstanding the pressure and heat generated in the combustion chambers of the engines with which they are used, while also displaying sufficient resiliency and sealing strength to effect the necessary seal.

An important physical property of any gasket is good torque retention and acceptable levels of compression set. In general, torque retention is associated with the amount of compressible material in a gasket. Compression set is defined as the residual deformation of a material after the removal of the force tending to compress it together. The compressibility of gaskets which employ compressible facing materials depends upon the type of compressible gasket facing material employed. In any event, the facing material must be sufficiently compressible so that it will conform to variations in the surfaces to be sealed, and so that it will be adequate to seal despite variations in the torquing load exhibited along the mating surfaces to be sealed.

It has been determined that additional sealing elements may be applied at selected locations to gaskets to provide gaskets of enhanced sealing capability. Thus, deformable beads and bead segments have been applied to gaskets to act as seals and to cooperate with the entire structure to enhance the sealing capacity of the facings. Such beads and bead segments deform under pressure or load and aid in realizing fluid-type seals between the facing parts to be sealed. Selective locations of the sealant beads or segments allow for improved sealing by giving high unit loadings where required. Such beads also permit the use of thinner compressible substrates or facings, and therefore contribute to reducing torque loss.

Where such beads comprise elastic sealant material, that permits selective contact of the gasket assembly with the surfaces to be sealed. In turn this permits higher clamping pressures where desired. Less bolting is required under such circumstances and, therefore, lighter weight and strength gasket components may be used.

For a number of years now, sealing components, such as elastomeric sealants in the form of beads, have been applied to gasket assemblies by a silk-screening process. An early patent disclosing and describing such a process is Hillier U.S. Pat. No. 3,477,867. In such a process, a selected gasket assembly or substrate is positioned adjacent a suitably patterned silk screen, and a liquid, paste-like sealant is squeezed through the screen onto the substrate. The sealant is suitably cured and the gasket is then ready for use.

Perhaps the most widely used sealants in silk-screening processes for gasket assemblies have been room temperature vulcanizable silicone rubbers (RTV silicones). RTV silicones have a number of advantages including relatively high temperature resistance, good strength under load, relative ease of application, among others. However, such materials also have drawbacks in terms of curing time (they must be cured at elevated temperatures because room temperature curing requires too long a holding time for practical mass production usage), sensitivity of the material to certain substrates which inhibit curing, and the like.

With current, two-component silk-screenable RTV silicone compositions and typical fiber-elastomer gasket facings, it has been found that barrier layers must be applied to the facings prior to silk-screening of the silicone to prevent "poisoning" of the silicone catalyst. Typically, such 2-part RTV silicones use a platinum catalyst to produce an addition-type cure at temperatures of about 375° F. for 2 to 3 minutes. When gasket facings have sulfur, nitrogen or halogen materials (typically found in nitrile rubber, neoprene curing agents, and protective agents, such as anti-oxidants, used in rubbers), curing is inhibited and adhesion of the sealant to the substrate is therefore diminished. In severe cases, the sealant will not cure at the interface, and adhesion to the substrate is therefore minimal. Of course, the longer the curing time at elevated temperatures, such as at 375° F., the more damage is done to the facing layers which tend to degrade at such temperatures.

To avoid all of this, barrier coats, as of phenolic materials, are applied to the facing layers prior to application of the sealant. Frequently, two such coats are necessary, each requiring an extended "cure" at an elevated temperature, such as at 375° F. for eleven minutes. This also tends to degrade many facings, causing them to harden and to become more brittle, resulting in gaskets of diminished sealing capability, because, for example, the harder the facing layer, the more torque is required to effect a seal in the zone in which the facing layers are to effect a seal. For example, nitrile rubbers tend to degrade at temperatures above 275° F.

Further, when high temperature cures of the RTV silicone and of the barrier coats are used and the facings become hard and brittle, not only does the gasket tend to become less effective as a seal, but the facings tend to impress less easily, causing overlying silicone beads to deform and squeeze laterally more than intended, tending toward promoting destruction of an effective bead seal. As such, the silicone used must be formulated to accommodate to this and such formulations frequently have a greater compression set (less recovery) than would be desireable.

Thus, it would be highly desireable to avoid the need for barrier coats, and the problems and expense which inhere in their use, to provide an improved silk-screening process for gaskets, to provide materials for silk-screening process which would avoid these and other problems and drawbacks to which users of conventional silk-screening processes must now accommodate and adapt, and to produce silk-screened gaskets in a relatively simple and straightforward manner.

SUMMARY OF THE INVENTION

In accordance with the present invention an improved method for producing gasket assemblies of enhanced sealing characteristics is provided. The method comprises the steps of providing a gasket body comprising at least one compressible facing layer of compressed fiber-elastomer material which is adapted to be positioned between a pair of members to be sealed to each other, the gasket body defining at least one clear through opening, providing a silk screen through which a fluid silicone sealant material is adapted to be squeezed in a desired sealing pattern onto the gasket body, providing on the silk screen a fluid, moisture-carbon dioxide curable, silicone sealant material which is curable in the presence of high humidity and carbon dioxide levels, and squeezing the desired sealing pattern directly onto the facing layer without the intervention of barrier coats. The method comprises the further step of preheating the gasket body to a temperature in excess of ambient atmostphere and thereafter positioning the patterned gasket body in a chamber, and then exposing the gasket body in the chamber to a conditioned atmosphere of high humidity and of a carbon dioxide content greater than the carbon dioxide content of ambient air for at least two minutes, thereby to cure the silicone sealant material to form an elastomeric silicone sealing pattern on the gasket body.

Preferably, the gasket body also comprises an expansive metallic core layer having two main surfaces, the compressible facing layer being laminated to a main surface of the metallic core layer. A compressible facing layer may be laminated to each main face of said metallic core layer.

In its preferred form for asbestos beater addition fiber-elastomer gasket materials, the method comprises exposing the printed gasket body to a conditioned atmosphere containing carbon dioxide in a volume percent of from about 9 to about 13 percent, a relative humidity of from about 85 to 100 percent, temperatures from about 90° F. to about 110° F., for a period of from about 5 to about 8 minutes. To enhance the adhesion and surface quality, the printed gasket body may be pre-conditioned, as by preheating to a temperature of from about 170° F. to about 185° F. for from about 30 to about 60 seconds in the absence of added moisture, i.e., at ambient moisture, prior to introduction into the conditioned atmosphere. Optimized processing of other substrates may result in changes in times and temperature used.

Further objects, features and advantages of the present invention will become apparent from the following detailed description of the invention and of a preferred embodiment thereof, from the claims, and from the accompanying drawings.

DETAILED DESCRIPTION

Figure 1:
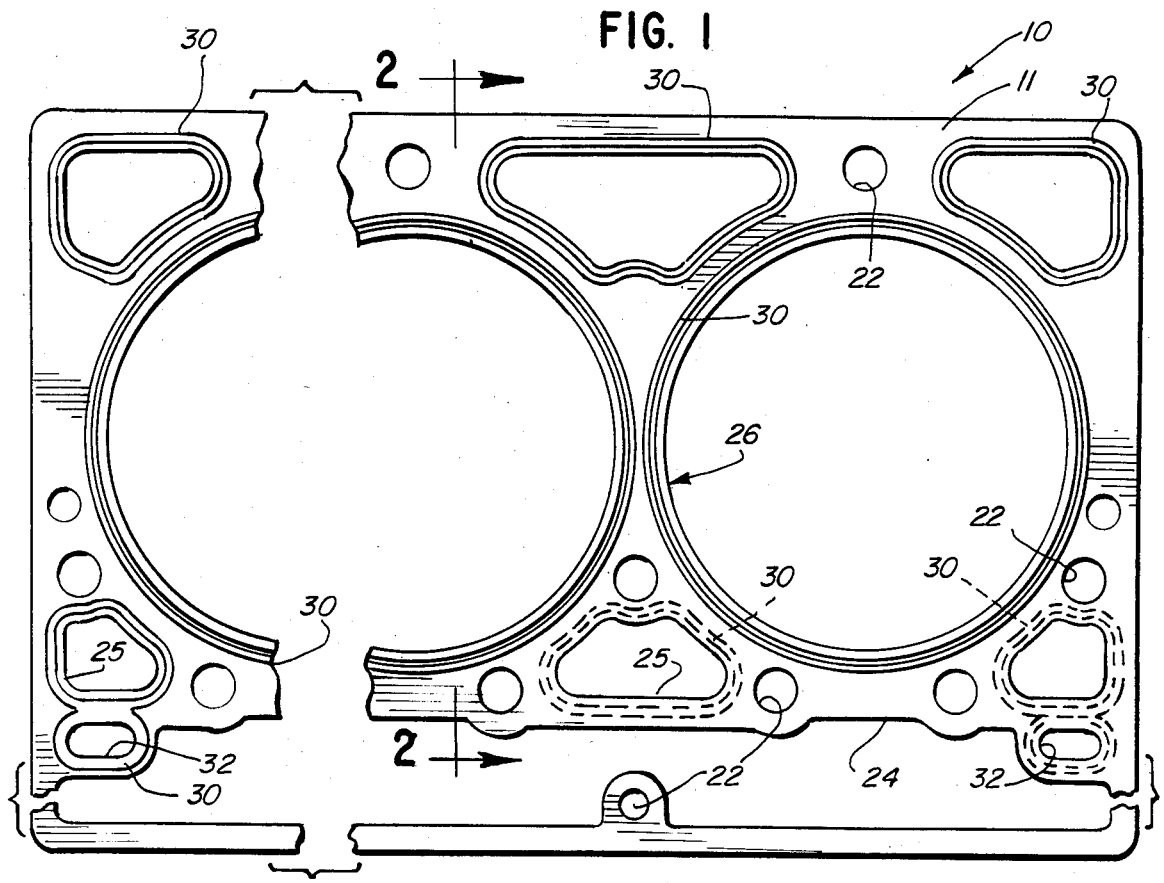
FIG. 1 is a plan view of a typical automotive head gasket assembly which may be made in accordance with the present invention.
Figure 2:
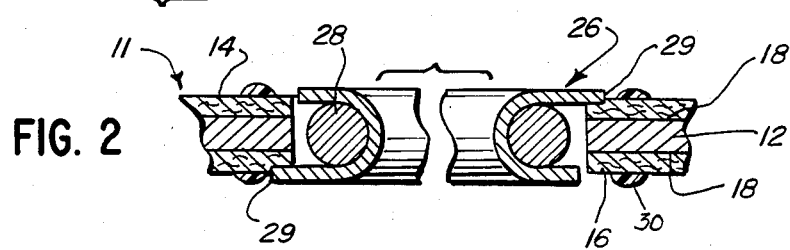
FIG. 2 is a cross-sectional view taken substantially along line 2—2 of FIG. 1.

Referring now to FIGS. 1 and 2, a typical head gasket assembly 10 is adapted to be disposed in a known manner between a pair of surfaces to be sealed, such as between the head and block of an internal combustion engine, and is adapted to be compressed therebetween. The head and block include combustion cylinders, sleeves, pistons, oil and coolant passageways, boltholes, etc., all as is conventional, and in a configuration to which the basic configuration of the gasket assembly 10 has been designed. The details of the engine per se, which may be a diesel engine, form no part of the present invention, except that each gasket assembly 10 of the present invention will be configured as dictated by the particular engine with which it is to be used, and will be proportioned to accommodate to the openings and surfaces in the head and block with which the gasket assembly is to be used. A patent showing typical combustion openings, water and oil passages, bolt holes and the like in a head gasket assembly is U.S. Pat. No. 3,565,449.

The gasket illustrated in FIG. 1 shows three of six combustion openings for use in an engine for which the head gasket assembly 10 has been designed.

Gasket assembly 10 comprises a main body portion 11 which may be a laminate, and is seen to comprise three gasketing layers laminated in conventional fashion to each other (FIG. 2) including a qenerally flat, solid, central expansive metallic layer or core 12 and a pair of generally flat expansive compressible, fiber-elastomer facing layers 14, 16. Core 12 comprises upper and lower flat, or planar faces, namely the surfaces 18 to which facing layers 14, 16 are laminated. The main body portion 11 may also be coined, embossed, or may be otherwise surface modified, as by etching, in desired locations.

Facing layers 14, 16 are desireably formed of a composite, fiber-elastomer compressible gasket facing material. They are laminated mechanically or adhesively to the core surfaces 18, as by a suitable heat-activated adhesive. Suitable heat activatable adhesives include phenolic-nitrile rubber and polybutyral rubber which is desirably initially applied to the facing layer surfaces. The facing layers 14, 16 may incorporate asbestos, glass fibers, cellulosic fibers, or other suitable fibrous materials, and may utilize nitrile, neoprene or polyacrylic elastomers as a binder. Frequently, the binder comprises from about 10 to about 25% of the facing layer, whether asbestos fibers, or whether other organic or inorganic fibers, fillers or the like are used. In the embodiment illustrated, the asbestos beater addition facing layers 14, 16 have a thickness of about 0.020 inch, although, of course, this may vary with the application, and may range from about 0.010 to about 0.035 inch. Facing layers 14, 16 generally resist degradation by oils and coolants, retain torque, minimize extrusion, and exhibit heat resistance.

The core 12 may be of cold rolled steel and its thickness may vary with the particular application. Core thicknesses of from about 0.015 inch to about 0.040 inch are typical. In the embodiment illustrated, the thickness of the core is about 0.015 inch. To enhance adherence, the core surfaces may be phosphatized in a conventional manner, or may be otherwise surface treated to improve adhesion.

The main body portion 11 of gasket assembly 10 is die-cut or blanked out, such as with a stamping machine, punch press or other suitable form of equipment to provide a plurality of openings, such as combustion openings 20, and apertures, such as bolt openings 22, and a plurality of fluid flow oil and water passageways.

The main body portion 11 may then be provided with a suitable fire ring or armor 26 secured in a known manner to seal the combustion openings. The annular armor 26 may be stainless steel of about 0.008 inch in thickness which may embrace a wire ring, such as steel ring 28. Desireably, the armor 26 may float, i.e., may be suspended adjacent the edges of the combustion openings by tabs 29 as in the manner described in U.S. Pat. No. 3,565,449. Alternatively, as desired, the armor may fully or partially overlap the combustion openings 20.

A desired sealing pattern may be disposed on and secured to one or both surfaces of the main body portion in selected zones. The sealing pattern may comprise a series of sealing beads, such as beads 30, applied to those zones in which increased or augmented sealing forces or supplemental seals are required or desired in the application for which the gasket assembly 10 is to be used. Typically, beads 30 are formed substantially to surround selected water and oil passages 25 between the associated head and block. Beads 30 may also be applied elsewhere, as around the armoring. At times, because of the configuration of the head and block, and the location of the bolt holes, or for other design reasons, less than a circular or completely encircling bead configuration may be desireable and used.

Figure 7:
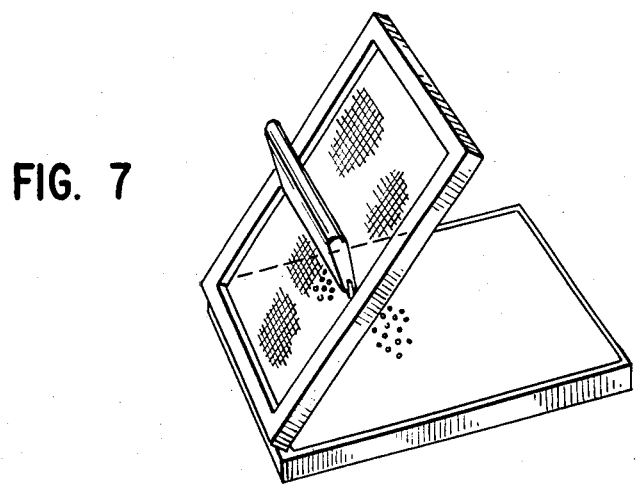
FIG. 7 schematically illustrates a typical silk-screening device of the type adapted for use in connection with producing gaskets in accordance with the present invention.

In the prior art, sealing beads 30 have been formed of a silicone sealant which has been deposited by a silk-screening process, typically as described in U.S. Pat. No. 3,477,867. Such beads have been deposited on barrier-coated, fiber-elastomer facing layers with typical heights at the high point of the bead of from about 0.004 to about 0.010 inch. Typical prior art silicones have been two-component, liquid silicones which are room temperature curable, but which are cured at elevated temperatures to speed the curing process. The sealing beads are precisely, accurately and consistently located from gasket to gasket. A typical schematic silk-screening device is shown in FIG. 7 with a support for a base or gasket to be silk-screened, a screen configured with an appropriate pattern and a squeegee means for forcing the silicone material through the openings in the screen to form the desired patterning.

Referring now to FIGS. 3–6, a suitable apparatus for producing cured gasket assemblies in accordance with the present invention comprises a curing assembly 100 including a curing chamber 110 having access doors 111 through which chamber a conveyor 102 is adapted to pass. To minimize possible corrosion, the interior of the chamber is of galvanized steel. The curing chamber and conveyor are suitably floor supported on legs 103, 105, respectively. The conveyor is preferably formed from galvanized flat wire mesh about one-half inch by one inch, and is trained over a pair of rollers 104, 106, one of which is driven by a suitable motor 107. The conveyor extends through the curing chamber and is desireably removeable therefrom as a unit. The conveyor is trained between removeable blank offs 108 which facilitate removal of the conveyor assembly and which also tend to curtain off the curing chamber from the ambient atmosphere as much as possible.

Figure 4:
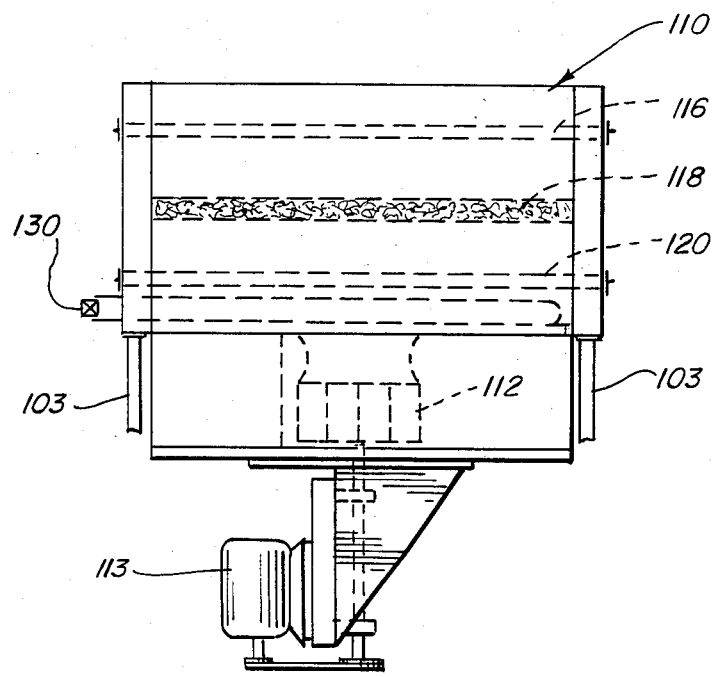
FIG. 4 is a side view of the curing chamber of FIG. 3.
Figure 3:
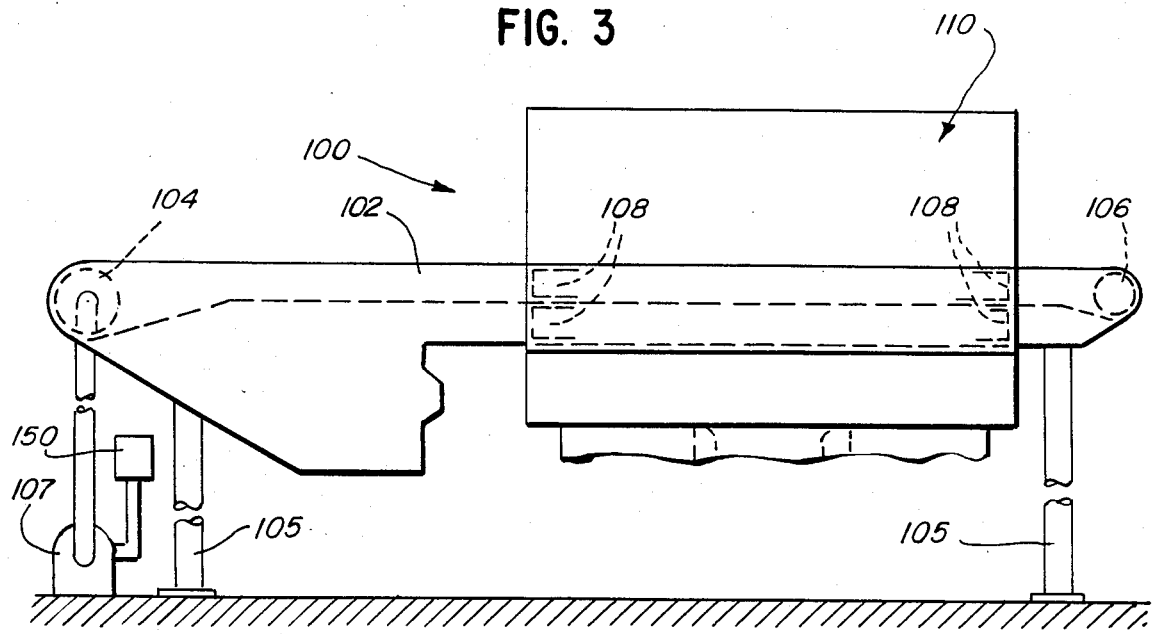
FIG. 3 is a side elevational view of a typical curing assembly in which a gasket assembly of the present invention may be cured.
Figure 6:
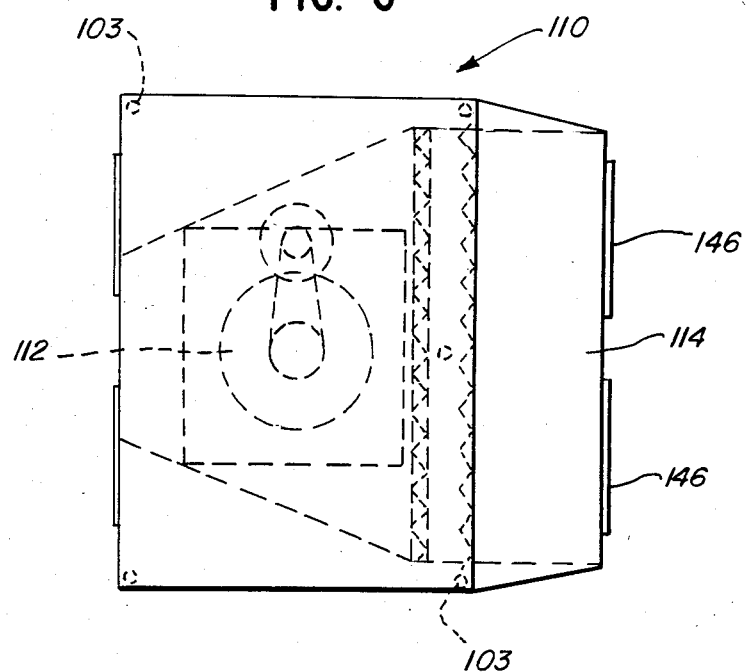
FIG. 6 is a plan view of the curing chamber of FIG. 3.
Figure 5:
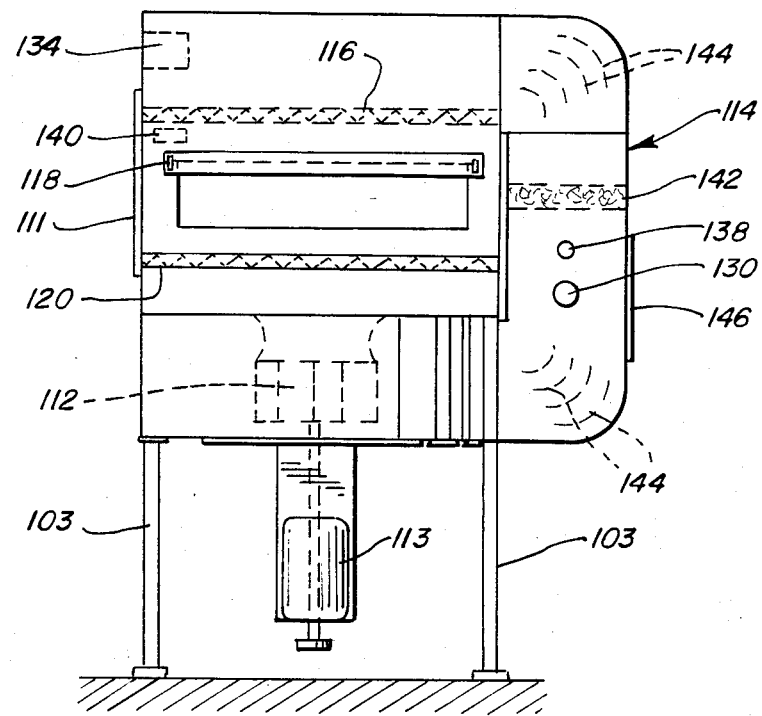
FIG. 5 is a view from the left of the apparatus of FIG. 3.

As best seen in FIGS. 4 and 5, the curing chamber 110 includes a blower 112 which is adapted to blow conditioned air upwardly through a distribution duct 114 which distributes conditioned air over the run of the conveyor extending through curing chamber 110. The blower is constructed to discharge up to about 2000 cubic feet of air per minute. A suitable motor 113 is provided to drive blower 112. The conditioned air passes through a vinyl coated aluminum damper assembly 116, through a removeable distributor mesh 118, as of spun aluminum, and then downwardly against and around gasket assemblies which are disposed on the conveyor 102. The air then passes through a further vinyl-coated aluminum damper assembly 120 and into the zone of the blower 112 for recirculation through the distribution duct 114. Damper assemblies 116 and 120 may be self-contained, removeable units. They are removeable, as through removeable access plates provided at the sides of curing chamber 110.

The distribution duct 114 is provided with a distribution mesh 142, as of spun aluminum, and with suitable additional baffles 144. Access to duct 114 is provided through removeable access doors 146.

The air is suitably conditioned by heating it, by introducing carbon dioxide into it, and by controlling its humidity at desired levels. To that end, an electronic steam humidifier 130 is positioned to humidify the air in distribution duct 114. The humidifier 130 is controlled remotely by a humidistat 134 which controls the humidity level within about two percent of the set point.

A suitable carbon dioxide injection tube 138 is provided. A carbon dioxide concentration sensor 140 is provided in the curing chamber 110 thereby to facilitate control over the desired carbon dioxide level in the conditioned air.

The speed of the conveyor is controlled by a speed controller 150, thereby to control the duration of exposure to the conditioned air in the curing chamber. The speed controller may adjust the conveyor speed within a range of from about 0.1 to 10 feet per minute.

As such, the rate of curing and the time of exposure of the gaskets to be cured in curing chamber 110 may be varied by controlling the speed of the conveyor, the humidity level of the conditioned air, the temperature of the conditioned air, and the carbon dioxide content of the conditioned air. The conditioned air is recirculated, and moisture and carbon dioxide are added as necessary. The access doors 111 may provide glass viewing sections to provide for physical inspection of the curing process as it is proceeding. The use of spun mesh baffles minimizes entrainment of drops of water which would detract from the quality of the cured gaskets.

Typical silicone materials which cure rapidly in the presence of carbon dioxide and high humidity, and which benefit further from the use of modestly elevated temperatures are described in U.S. Pat. Nos. 4,170,700 and 4,471,007, the disclosures of which are here incorporated by reference. Although those patents state that their carbon dioxide-humidity vulcanizable compositions may be used for gaskets for automotive or like uses, they do not disclose or suggest the method disclosed and claimed herein.

As stated, a gasket assembly 10 made in accordance with the present invention provides at least one silicone elastomer bead 30. Beads 30 are formed from a silk-screen deposited, cured 100% solids silicone composition. The curable silicone composition is one which has an average viscosity of about 18,000 cps. The material is silk-screened at desired locations with specific bead widths and heights. To enhance adhesion and surface quality of the finished product, it is necessary to preheat the screened gasket above the dew-point of ambient atmosphere. To bring the screened gasket to a temperature above the ambient dew-point, the silk screened gasket is preferably preheated at low temperatures, such as from about 150° F. to about 250° F., and most preferably at a temperature of about 170° F. to about 185° F., for a period of from fifteen seconds to about four minutes, and preferably from about thirty to about sixty seconds as by passing the silk-screened gasket through a preheating chamber, such as a heating tunnel or oven.

Immediately thereafter, the gasket is conveyed into a curing chamber in which the silicone beads are cured in a short period of time by exposure to conditioned air having an elevated temperature and containing moisture and carbon dioxide at levels in excess of the ambient atmosphere. Typically, exposure of the beads to a conditioned atmosphere having carbon dioxide in a volume of from about 5 to about 20%, and preferably from about 9% to about 13%, a relative humidity of from about 70% to about 100%, and preferably from about 85% to about 100%, and for a period of from about 3 to about 25 minutes, and preferably from about 5 to about 8 minutes, has been found to be desirable. Where the metal components or core of a gasket assembly are relatively thick, a somewhat longer cure time will be necessary at a given temperature because the metal core acts as a heat sink. The temperature of the conditioned air may be from about 90° F. to about 110° F., and up to from about 150° F. to about 230° F., well below the temperature at which the facings may tend to degrade.

EXAMPLE I

A curable silicone formulation for use in accordance with the present invention was prepared. The formulation was a one-component, 100% solids moisture curing silicone elastomer, such as a mixture of hydroxyl terminated organopolysiloxanes and an amino silicone compound, of the type described in the examples of U.S. Pat. No. 4,170,700. Its viscosity at 25° C. was 18,000 cps. Its specific gravity at 25° C. was 1.40. Its cure time in ambient air at 25° C. and fifty percent relative humidity was greater than 5 days. Its working life on a silk screen in producing good cures subsequently was up to four hours and more, and it did not meaningfully thicken during that period of time. The four-hour work life is comparable to the work life of typical two-component silicones now used for silk screening purposes and an improvement over typical one-component, moisture curing, RTV silicones which have a six to eight minute work life making them unsuitable for silk screening applications.

A pattern of the formulation was silk screened onto a gasket body comprising a central metallic core and asbestos fiber-elastomer facings on each surface of a tin-plated steel core which was 0.015 inch thick. The fiber-elastomer facings were of an asbestos beater sheet with a nitrile rubber binder and were about 0.020 inch thick and required no barrier coat. Promptly after silk screening, the gasket body was preheated at a temperature of 175° F. for 30 seconds. The gasket body was then placed in a curing chamber in which a conditioned atmosphere was maintained. The conditioned atmosphere was maintained at about 100° F., ±5° F., at a relative humidity of 100%; and, at a carbon dioxide level of 11% by volume for 6½ minutes. At that time, the silicone pattern was cured throughout and was found to have good adhesion to the facing.

The material from which the silicone pattern of Example I was formed was found to have a number of improved properties, as compared to typical two-component silicone patterns, as follows:

| Description | Typical Two-Component Silicone Formed Into A Tensile Slab And Cured 30 Minutes At 300° F. | Silicone Pattern Material Of Example I Formed Into A Tensile Slab Cured by 30 Second Preheat At 175° F., 30 Second In Moist $CO_2$, And Held 7 Days At 50% RH |
|---|---|---|
| Durometer, Shore A | 65 ± 5 | 50 |
| Tensile Strength, psi | 500 min. | 315 |
| Elongation, % | 100 min. | 150 |
| Compression Set, % (Method B, 22 hrs. 347° F.) | 30 max. | 20 |
| Change in Hardness, points | +10 max. | 0 |
| Change in Tensile Strength, % | −25 max. | +10.5 |
| Change in Elongation, % | −50 max. | −5.5 |
| ASTM #1 Oil, 70 hrs. 302° F. | | |
| Change in Tensile Strength, % | −20 max. | +1 |
| Change in Elongation, | −20 max. | −10 |
| Change in Hardness, points | 0 to −15 | −3 |
| Change in Volume % | 0 to +10 | +4.5 |
| ASTM #3 Oil, 70 hrs. 302° F. | | |
| Change in Hardness, points | −30 max. | −5 |
| Change in Volume, % | +60 max. | +38 |

The gasket made in accordance with Example I was found to have properties consistent with those just listed, an improvement over conventional gaskets made with the two-component silicone materials, and consistent with the advantages and improvements described herein.

EXAMPLE II

A test washer pattern using a gasket material base generally similar to the gasket base of Example I was coated with the elastomer of Example I. The gasket material was preheated for three minutes at 230° F. The coated gasket was cured at 100% relative humidity in an atmosphere of about 11% carbon dioxide for 20 minutes. The ambient temperature was about 100 degrees. The test washer exhibited the advantageous properties described herein.

EXAMPLE III

A gasket comprising a tin plate core 0.024 inch thick and non-asbestos-nitrile binder facing sheets 0.016 inch thick was preheated for 2 minutes at 175° F. It was coated as described in Example I, except that the cure time was eight minutes. When cured under the same conditions described in Example I, the gasket exhibited the same advantageous properties described herein as compared to silk-screened, two-component silicone systems.

Other one-component silicone compositions which are moisture and carbon dioxide curable may be used, as may be other applicable concentrations in, and temperature of, the conditioned atmosphere. In all cases, it appears that substantial improvements in the silk-screening process evolve from the use of the one-component curable silicones of this invention, and that improved processing characteristics are derived therefrom. Precoating of the gasket bases with barrier coats is not necessary for processing, and the seals in the final gaskets exhibit good adhesion to the base and improved sealing. Indeed, for some fiber-elastomer facing materials, such as those using cellulosic fibers, the end product is much more precise than those produced with currently used silicones. This is because the higher temperatures now used with current processes alter the dimensional characteristics of the gaskets, whereas the lower temperatures used in accordance with the present invention do not have that deleterious effect.

It will be apparent from the foregoing that further embodiments of the invention may be made without departing from the spirit and scope of the invention. Accordingly, the scope of the invention is to be considered as being limited only insofar as may be made necessary by the claims.

What is claimed is:

1. A method of making an automotive engine gasket assembly of enhanced sealing characteristics comprising the steps of providing a gasket body defining at least two clear-through combustion openings, said gasket body being adapted to be positioned between a pair of engine members to be sealed to each other, said gasket body comprising an expansive metal core having two main surfaces and at least one compressible facing layer of compressed fiber-elastomer material, providing a silk screen through which a fluid silicone sealant material is adapted to be squeezed in a desired sealing pattern directly onto said facing layer, providing on said silk screen a fluid, moisture-carbon dioxide curable, silicone sealant material which is curable in the presence of high humidity and carbon dioxide levels, and squeezing said desired sealing pattern directly onto said facing without the intervention of a barrier coat, preheating said gasket body to a temperature of at least 150° F. for from about 15 seconds to 4 minutes, and then, after preheating said gasket body, positioning said gasket body in a chamber and exposing said gasket body in said chamber to a conditioned atmosphere of high relative humidity of from at least about 85% relative humidity and of a carbon dioxide content greater than the carbon dioxide content of ambient air and from about 5% to about 20% carbon dioxide for at least three minutes, thereby to cure said silicone sealant material to form an elastomeric silicone sealing pattern on said gasket body.

2. The method in accordance with claim 1, and in which the gasket body further comprises a compressible facing layer laminated to each main surface of said metallic core.

3. The method of claim 2, and comprising the further step of exposing said gasket body to a temperature of from about 90° to about 230° F. while exposing the gasket body to said conditioned atmosphere.

* * * * *